(12) United States Patent
Lindquist

(10) Patent No.: US 6,931,419 B1
(45) Date of Patent: Aug. 16, 2005

(54) DATA MANAGEMENT SYSTEM FOR AUTOMATICALLY ACCESSING, MAINTAINING, PROPAGATING USER DATA AMONG PLURALITY OF COMMUNITIES, EACH OF WHICH CONTAINS PLURALITY OF MEMBERS

(75) Inventor: Wesley DeWayne Lindquist, Kansas City, MO (US)

(73) Assignee: Hallmark Cards Incorporated, Kansas City, MO (US)

( * ) Notice: Subject to any disclaimer, the term of this patent is extended or adjusted under 35 U.S.C. 154(b) by 0 days.

(21) Appl. No.: 09/502,728

(22) Filed: Feb. 11, 2000

(51) Int. Cl.$^7$ .............................................. G06F 17/30
(52) U.S. Cl. .............................. 707/200; 707/1; 707/9
(58) Field of Search ........ 345/739, 963; 358/400–402; 379/100.08, 93.24, 93.25; 380/255; 719/206–207, 719/200, 317; 713/201, 200, 168; 705/8–9, 705/44, 39, 26–27; 707/1–10, 100–104, 200–205; 709/223–225, 227

(56) References Cited

U.S. PATENT DOCUMENTS

| | | | |
|---|---|---|---|
| 5,146,403 A | | 9/1992 | Goodman .................... 707/102 |
| 5,530,853 A | * | 6/1996 | Schell et al. .................... 707/1 |
| 5,724,521 A | * | 3/1998 | Dedrick ......................... 705/10 |
| 5,754,306 A | * | 5/1998 | Taylor et al. ................. 358/400 |
| 5,761,661 A | * | 6/1998 | Coussens et al. ............... 707/9 |
| 5,771,280 A | * | 6/1998 | Johnson .................... 379/93.23 |
| 5,813,009 A | * | 9/1998 | Johnson et al. ............. 707/100 |
| 5,950,193 A | | 9/1999 | Kulkarni ......................... 707/3 |
| 5,956,637 A | * | 9/1999 | Ericsson et al. .......... 455/432.3 |
| 5,960,409 A | * | 9/1999 | Wexler ......................... 345/738 |
| 5,966,714 A | | 10/1999 | Huang et al. ................ 707/201 |
| 6,009,410 A | * | 12/1999 | LeMole et al. ................. 705/1 |
| 6,101,480 A | * | 8/2000 | Conmy et al. .............. 345/963 |
| 6,189,026 B1 | * | 2/2001 | Birrell et al. ................ 709/206 |

(Continued)

FOREIGN PATENT DOCUMENTS

| | | | | |
|---|---|---|---|---|
| EP | 0820182 A2 | * | 1/1998 | ....................... 3/50 |

(Continued)

OTHER PUBLICATIONS

B&I Computer consultants, Inc(www.Band/Software.com), RETAIL Sage manual (Retail point of sale and customer management system) version 1.2 pp 1-22.*

(Continued)

Primary Examiner—Srirama Channavajjala
(74) Attorney, Agent, or Firm—Patton Boggs LLP

(57) ABSTRACT

The present community membership data management system identifies each user and their associated communities of interest. Each community has a user defined permission to access a subset of the user's data, which data is shared among some or all of the members of that community. When the user's data is updated, the update is automatically propagated to all of the identified associated communities of interest and the members of those communities who have permission to receive that data. Thus, each user of the present community membership data management system has their computerized calendar and address book system automatically populated with data, which data is continuously and automatically updated. The confidentiality and security of the user data is maintained by defining a set of permissions among the communities, members of communities and for each user to ensure that the user maintains control of the propagation of their data. Each user therefore maintains a "virtual user image" in each of the communities, where the members of that community view only one aspect of the user's personal data.

30 Claims, 8 Drawing Sheets

U.S. PATENT DOCUMENTS

| | | | |
|---|---|---|---|
| 6,202,083 B1 * | 3/2001 | Chrabaszcz | 709/203 |
| 6,253,203 B1 * | 6/2001 | O'Flaherty et al. | 707/10 |
| 6,311,185 B1 * | 10/2001 | Markowitz et al. | 705/10 |
| 6,377,993 B1 * | 4/2002 | Brandt et al. | 709/227 |
| 6,460,081 B1 * | 10/2002 | Doherty et al. | 709/225 |
| 6,687,362 B1 * | 2/2004 | Lindquist et al. | 379/218.01 |
| 6,782,003 B1 * | 8/2004 | Giroux et al. | 370/466 |

FOREIGN PATENT DOCUMENTS

| | | | | |
|---|---|---|---|---|
| EP | | 0944003 | * | 9/1999 |
| WO | WO 94/16398 | | * | 7/1994 ... 15/403 |
| WO | WO99/04344 A1 | | | 1/1999 |
| WO | WO 01/91351 | | * | 11/2001 |
| WO | WO 02/46954 | | * | 6/2002 ... 17/30 |
| WO | WO 2004/072872 | | * | 8/2004 ... 17/60 |

OTHER PUBLICATIONS

Maximizer Enterprise 8 simple successful CRM, Maximizer enterprise eCRM quick reference guide, 20 pages.*

* cited by examiner

| MEMBERS OF "BRIGGS 2" COMMUNITY |
|---|
| JoeBaxter@yahoo.com<br>MAYOR |
| Tigger@usa.net |
| Bronco@excite.com |
| Wlindql@hallmark.com |
| Badcat@grapevine.net |
| Buzz@kcinter.net |
|  |

*FIG. 2*

| KNOWLEDGE SHARING RELATIONSHIPS FOR Bronco@excite.com |||
|---|---|---|
| Community A | → | Community B |
| Community A | → | Community C |
| Community A | ← → | Community D |
| Community B | None | Community C |
| Community B | ← | Community D |
| Community C | ← | Community D |
|  |  |  |

*FIG. 3*

Address Book for Jack Power

| Last Name | First Name | Address | City | State | Zip | Phone Number | Email | Community | Access Level1 | Access Level2 | Access Level3 |
|---|---|---|---|---|---|---|---|---|---|---|---|
| Doe | Jane | 2224 Mockingbird | Anytown | MO | 11144 | 816-555-8888 | jadoe@yahoo.com | Family | YES | YES | YES |
| Doe | John | 188 State Street | New York | NY | 10056 | 313-555-2222 | jodoe@yahoo.com | Family | YES | YES | YES |
| Hallmark | Suzie | 424 S. Minnesota | Nowhere | KS | 66555 | 785-555-2668 | szq@hallmark.com | Work | NO | YES | NO |
| Doe | Mom | 333 Lincoln Blvd. | Boston | MA | 10000 | 888-555-1111 | madoe@yahoo.com | Family | YES | YES | NO |
| Doe | Dad | 333 Lincoln Blvd. | Boston | MA | 10000 | 313-555-2222 | dadoe@yahoo.com | Family | YES | YES | NO |
| Hallmark | Bill | 765 Washington Street | Kansas City | KS | 66543 | 785-555-1344 | bbill@hallmark.com | Work | NO | YES | NO |
| Right | Dewey | 344 Arrow Lane | Kansas City | MO | 66502 | 816-555-2346 | dright@abbc.com | Church | YES | YES | NO |
| More | Patty | 678 Grambling Road | Kansas City | MO | 66502 | 816-555-2347 | pattym@kc.net | Church | YES | YES | NO |
| Slice | Pete | 117 Greenway | Kansas City | MO | 66502 | 816-555-2348 | slice@kc.net | Golf League | YES | NO | YES |
| Hook | Frank | 8990 79th Street | Kansas City | MO | 66502 | 816-555-2349 | hook@golf.com | Golf League | YES | NO | YES |

| Data Fields | Level |
|---|---|
| Home Address | 1 |
| Home Phone | 1 |
| Personal Email | 1 |
| Business Address | 2 |
| Business Phone | 2 |
| Business Fax | 2 |
| Business Email | 2 |
| Mobile Phone | 1 |
| Clothing Preferences | 2 |
| Clothing Sizing | 2 |
| Personal Preferences | 3 |
| Hobbies | 3 |
| Favorite Teams | 3 |
| Golf Handicap | 3 |

*FIG. 7*

DATA MANAGEMENT SYSTEM FOR AUTOMATICALLY ACCESSING, MAINTAINING, PROPAGATING USER DATA AMONG PLURALITY OF COMMUNITIES, EACH OF WHICH CONTAINS PLURALITY OF MEMBERS

FIELD OF THE INVENTION

This invention relates to the field of computerized calendar and address book systems and, in particular, to a system for automatically maintaining the accuracy and completeness of the data contained therein.

Problem

It is a problem in the field of computerized calendar and address book systems to maintain the accuracy and completeness of the data contained therein. Existing computerized calendar and address book systems are architected as "flat files" with the expectation that each individual enters data into their personal computerized calendar and address book system independent of any other computerized calendar and address book systems. The insular nature of the computerized calendar and address book systems renders the data input and data management tasks time consuming and subject to inaccuracy.

In particular, existing computerized calendar and address book systems rely on the user to input the data, verify its accuracy, and maintain the data so that it is current. Even a set of data entries of modest extent is time consuming to maintain, due to the individuals identified therein moving, changing telephone numbers, and the like. If the data contained in the computerized calendar and address book system is more than simple address information, then the data collection task becomes far more complex, since it is difficult to obtain such information and maintain such information. For example, gift preferences and clothing sizes represent typical useful data that would be beneficial to place in such a system, but the gift preferences of individuals change over time and in response to gifts previously received. The maintenance of clothing size data for children can be extremely difficult due to their rapidly changing sizes.

Therefore, existing computerized calendar and address book systems are of limited usefulness and are typically limited to the storage of basic information, such as: name, address, telephone number, birthday. These existing computerized calendar and address book systems are insular in nature and require manual data entry and data updating by the user.

One system that addresses the automated change of address issue is disclosed in U.S. Pat. No. 5,146,403 which discloses a change of address system that uses a plurality of public change of address kiosk terminals installed at a wide diversity of public locations to receive and store customized user change of address information. The user inputs their updated address information into the change of address kiosk terminal, which forwards this data to a central service computer. The central service computer transmits recipient information to the change of address kiosk terminal for display to the user who selects various of these displayed recipients to receive the change of address information as well as other recipients, whose address information is manually entered into the change of address kiosk terminal by the user. The change of address kiosk terminal prints change of address cards for selected ones of these identified recipients and automatically forwards the user change of address information to the postal service and other selected recipients identified by the user. This change of address system simply automates the printing of the change of address cards at the change of address kiosk terminal based on user provided information and electronically transmits the change of address card information to selected recipients.

Thus, there is presently no system that automates the data collection and maintenance tasks for a plurality of individual computerized calendar and address book systems.

Solution

The above described problems are solved and a technical advance achieved by the present reciprocal, maintenance free community membership data management system (termed "community membership data management system" herein) which automates the data collection and maintenance tasks for computerized calendar and address book systems. The community membership data management system is architected to parse the universe of individuals into a multidimensional space. Each individual is a member of at least one community, such as: family, work, church, social group, professional/technical society, school, residential location, store customer, and the like. Each community has a set of members and each member has associated therewith a collection of public data as well as personal, confidential data. The user's data is shared among these communities in a secure manner to precisely regulate the type of data that is distributed to members of various communities of which the user is a member. A particular individual need not specify their address-book entries on a community basis, but can simply list individuals absent a community delimiter, and rely on the system to manage the individual address book data based upon the unique identity of the named individuals, such as by address, or E-Mail address, or a combination of identity confirming data. To illustrate the capabilities of the community membership data management system, the following description is couched in terms of the use of community.

The present community membership data management system identifies each user and their associated communities of interest. Each community has a user defined permission to access a subset of the user's data, which data is shared among some or all of the members of that community. When the user's data is updated, the update is automatically propagated to all of the identified associated communities of interest and the members of those communities who have permission to receive that data. Thus, each user of the present community membership data management system has their computerized calendar and address book system automatically populated with data, which data is continuously and automatically updated. The confidentiality and security of the user data is maintained by defining a set of permissions among the communities, members of communities and for each user to ensure that the user maintains control of the propagation of their data. Each user therefore maintains a "virtual user image" in each of the communities, where the members of that community view only one aspect of the user's personal data.

There are a number of implementations possible for the present community membership data management system. In particular, this system can maintain a user's computerized calendar and address book system at a central location, such as on an Internet WEB site, for remote access by the user, or can transmit the address update data to the user's computerized calendar and address book system which executes on a terminal device operated by the user and is connectable to the present community membership data management system via a data communication connection, or can operate in some alternate combination or variation of these two operational modes.

BRIEF DESCRIPTION OF THE DRAWING

FIGS. 2 and 3 illustrate in table form typical database entries used in the present community membership data management system;

FIG. 7 illustrates a typical directory structure that can be used in a user's computerized calendar and address book system.

DETAILED DESCRIPTION

Figure 1A:
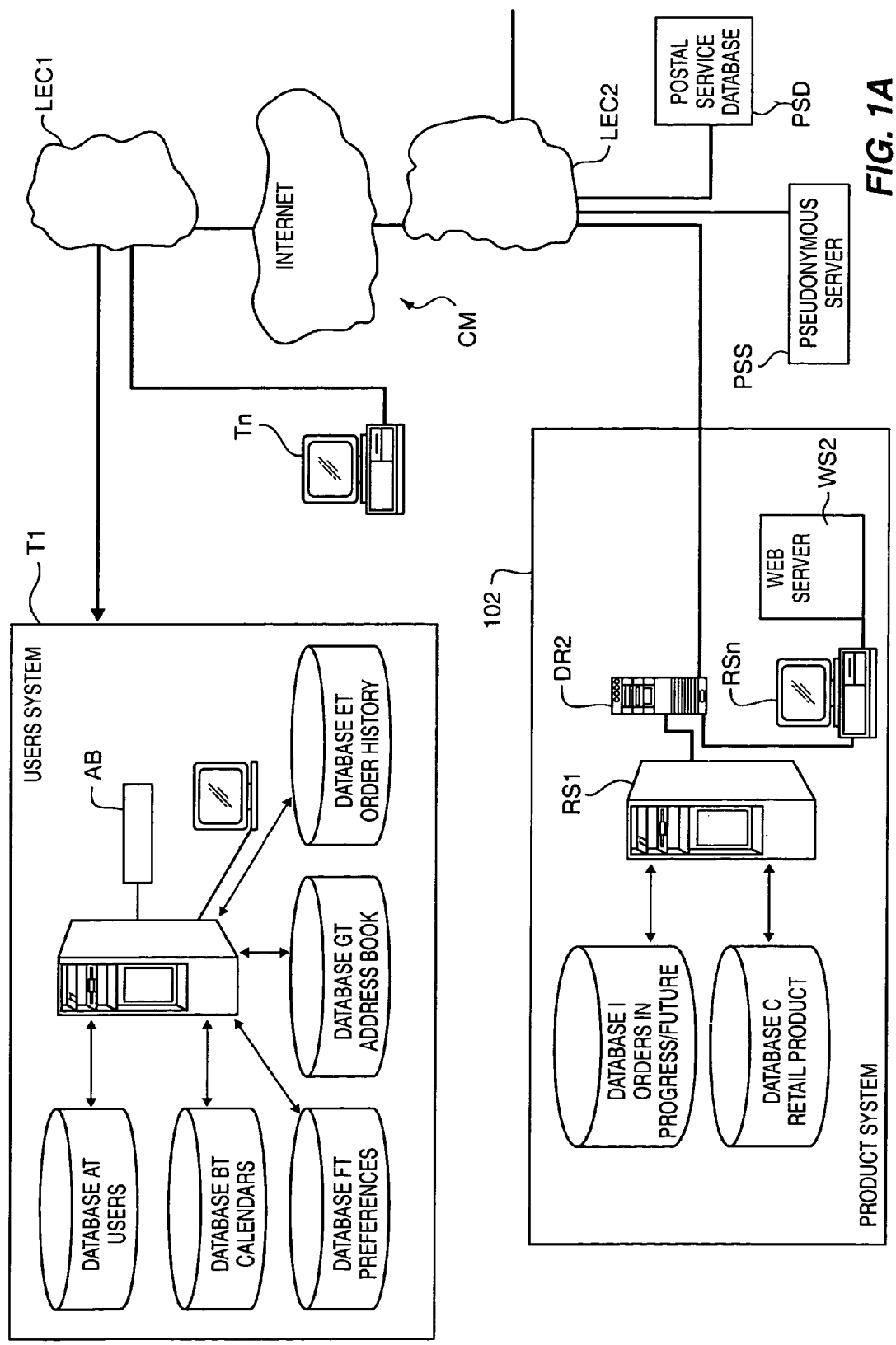
FIGS. 1A and 1B illustrate in block diagram form the overall architecture of the present community membership data management system and a data communication environment in which it is operational.

The community membership data management system automates the data collection and maintenance tasks for computerized calendar and address book systems. The computerized calendar and address book systems typically execute on a terminal device operated by the user, although they can also execute at a central location for remote access by the user. The computerized calendar and address book systems encompass a broad variety of applications for the management of user data, which user data include, but are not limited to: mailing lists, appointment calendars, social occasion calendars, membership lists, gift registry for a special occasion, personal data relating to gift recipient clothing sizes, personal data relating to gifts given in the past to a recipient, and the like. The community membership data management system is architected to parse the universe of individuals with whom the user wishes to interact into a multidimensional space. Each individual is a member of at least one community, such as: family, work, church, social group, professional/technical society, school, residential location, store customer, and the like. Each community has a set of members and each member has associated therewith a collection of public data as well as personal, confidential data. The user's data is shared among these communities in a secure manner to precisely regulate the type of data that is distributed to members of various communities of which the user is a member.

The present community membership data management system identifies each user and their associated communities of interest. Each community represents a logical grouping of individuals who are: related by blood or marriage, or are associated in an organization, or have related interests. Each community has a set of user defined permissions to access a subset of the user's data, which data is shared among some or all of the members of that community. The user can specify various levels of security in terms of the extent of the distribution of the user data, both within the community as well as external to the community. The data is preferably self-defining in that the set of user defined permissions is not lost as the data is propagated among communities. When the user's data is updated, the update is automatically propagated to all of the identified associated communities of interest and the members of those communities who have permission to receive that data. Thus, each user of the present community membership data management system has their computerized calendar and address book system automatically populated with data, which data is continuously and automatically updated. The confidentiality and security of the user data is maintained by defining a set of permissions among the communities, members of communities and for each user to ensure that the user maintains control of the propagation of their data. Each user therefore maintains a "virtual user image" in each of the communities, where the members of that community view only one aspect of the user's personal data.

System Architecture

Figure 1B:
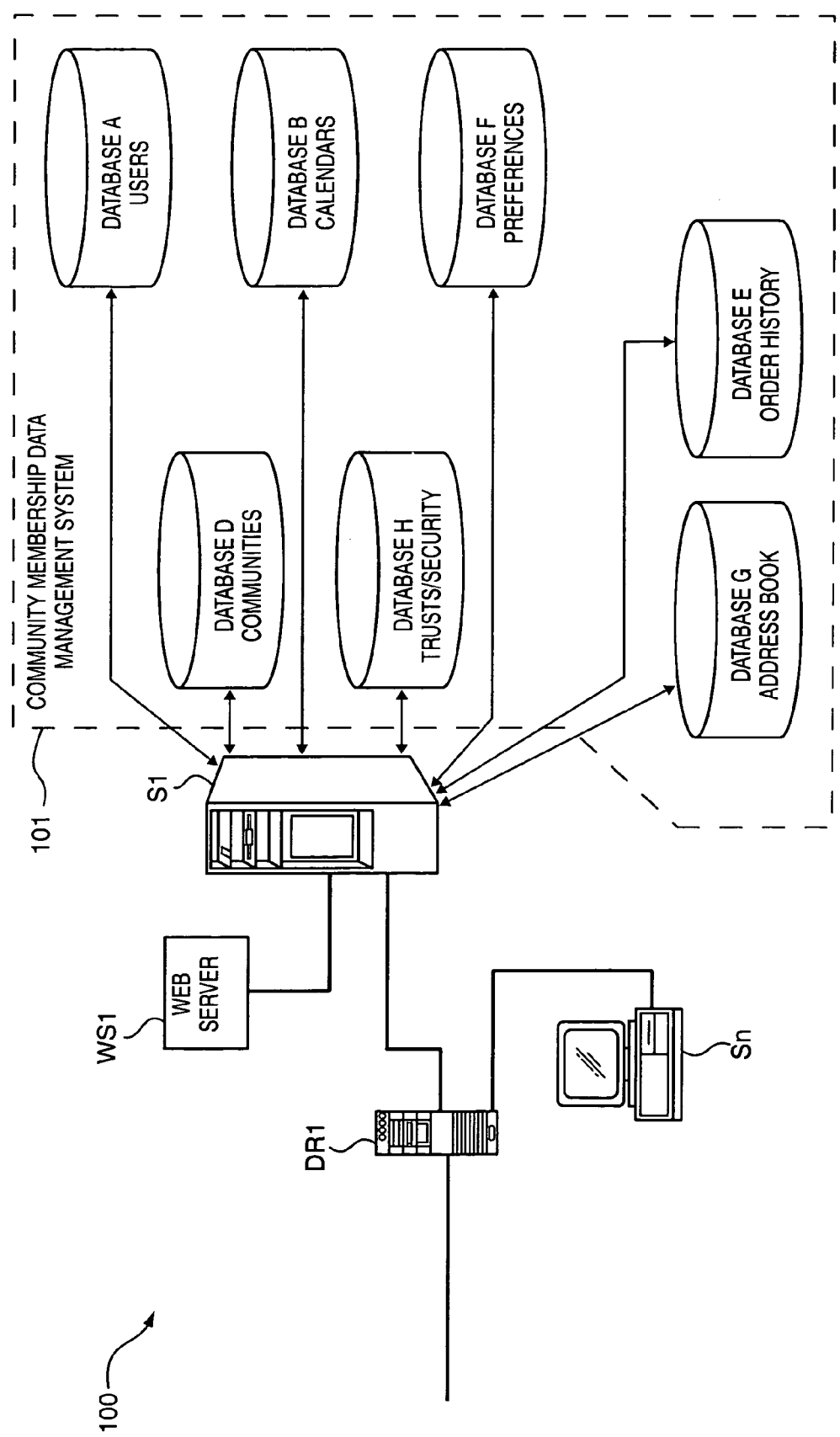

FIG. 1 illustrates in block diagram form the overall architecture of a basic, single site implementation of the present community membership data management system and a typical data communication environment in which it is operational. In particular, the present community membership data management system 101 is incorporated in a data storage and processing complex 100 that is connected to at least one data communication medium CM (such as the Internet) to thereby enable customers to obtain data communication connections with the community membership data management system 101. The customers are typically equipped with a personal computer, hand held computing device, cellular communication device, or other data interface device, collectively termed "terminal equipment" T1–Tn herein.

The consumer can perform an access to their computerized calendar and address book system AB (such as a day-timer type of system), which is shown as resident on the user's terminal equipment T1, and the data input by the user in this procedure may then be downloaded to the community membership data management system 101 via the user's terminal equipment T1. The user's terminal equipment can optionally maintain a Database AT that identifies the users who use the terminal equipment T1, such as the various members of a family. In addition, Database BT stores calendar information to indicate social occasions for the users of terminal equipment T1, while Database GT lists the addresses of individuals known to the users of terminal equipment T1. Similarly, the terminal equipment T1 can be used to track user preferences, which are stored in Database FT, as the user(s) execute on-line purchases, even though not logged into the WEB site that maintains community membership data management system 101, with the order history of these purchases being recorded in Database ET. Thus, the databases on terminal equipment T1 can be used to supplement the information collected and maintained by community membership data management system 101.

Alternatively, the entirety, or a portion, of the address book function is resident on the community membership data management system 101. For the purpose of this description, an Internet data communication connection to the address book function resident on the community membership data management system 101 is used as the example to illustrate the operation of the community membership data management system 101. The data communication connection between the user's terminal equipment T1 and the community membership data management system 101 can be via the Internet, using the well known personal computer modem and Internet browser technology available at the user's terminal equipment T1. The physical connection that supports this data communication connection is typically effected from user's terminal equipment T1 through the Local Exchange Carrier LEC1 of the Public Telephone Switched Network (PTSN) to the Internet CM which is also connected thereto. The Internet CM is also connected to a Local Exchange Carrier LEC2 which serves the communications and data router DR1 of the community membership data management system 101.

The data processing system 100 on which the community membership data management system 101 resides, includes: interactive web server WS1, communications and data router DR1, a plurality of servers S1–Sn which function to manage a plurality of databases, some of which can optionally or in part be resident on the user's terminal equipment T1. The community membership data management system 101 includes various data management processes, some of which are described below, as well as a plurality of databases which include: Database A—Users, Database B—Calendars, Database D—Communities, Database E—Order History, Database F—Preferences, Database G—Address Book, Database H—Security. In addition, at least one Product System 102 (such as a retail outlet) is connected to the data communication medium (Internet CM) and includes: interactive web server WS2, its communications and data router DR2, a plurality of servers RS1–RSn which function to manage a plurality of databases: Database C—Products, Database I—Order History.

In addition, other databases and server systems can be connected to the Internet CM and accessed by the community membership data management system 101 to perform the functions described herein. For example, a Postal Service Database PSD can be accessed to obtain accurate address information for users and designated community members, which data is used to populate the address Database G. Furthermore, a pseudonymous server PSS can be used to provide users with anonymity is their participation in communities, as is described below.

Architecture and Content of Databases

The community membership data management system 101 functions as the central repository of community definition data as well as the data relating to each member of every community. Thus, the members have associated therewith a set of data representative of the member's personal attributes, such as: name, mailing address, date of birth, E-Mail address, telephone number, fax number, clothing sizes, gift preferences, and the like. It is important that this member data is distributed to the various communities in an organized manner to protect this data from disclosure to individuals who do not have a right to access this data as well as to limit the data elements that are provided to each community. For example, the community of family members would have access to member data that differs from the member data that is shared with the community of business associates. It is therefore the function of the community membership data management system 101 to orchestrate the automated collection, distribution and updating of member and community data. The data can be stored entirely within the community membership data management system 101 or can reside in whole or in part on other servers PSD which are accessible via the data communication network CM. The data can include public data repositories, such as the telephone number and address listings available in the "White Pages" of the telephone directory or postal address information available in the Postal Service Database PSD.

The FIGS. 2 and 3 illustrate in table form typical database entries used in the present community membership data management system 101. In particular, the table of FIG. 2 illustrates the contents of a typical community: community name as selected by the individual who created the community, the name and address (such as E-Mail address) of the "Mayor" of the community and the name and address (such as E-Mail address) of each member of the community. FIG. 3 illustrates a table of data sharing among communities for an individual, with the individual's identity being defined as the header of the file and a listing of all combinations of communities to which the user is a member being provided and an indication of the data sharing relationship between each pair of these communities. In this example, Community A shares data with all of the other communities in which Bronco@excite.com is a member, but only receives data directly from Community D. In addition, Community B obtains data from Community A and Community D, but does not receive data from Community C. Community B and Community C do not share their data with any other Community. Community C obtains data from Community A and Community D, but does not receive data from Community B. Community D shares its data with all of the other Communities but only receives data from Community A.

FIG. 7 illustrates a typical address book structure that can be used in a user's computerized calendar and address book system to enable the user to organize the data stored therein. The address book contains basic address and community membership information, including: name, address, telephone number, E-Mail address, community membership, as well as data Access Level authorization. The user's address book can also include a significant amount of personal data relating to the interests of the user. These various data elements are divided into a plurality of data fields, listed below the address book entries. Associated with each data field is an Access Level assigned by the user to indicate the level of sensitivity or logical grouping of the associated data. Thus, basic user address information is grouped into Access Level 1, while business information and clothing sizes are grouped into Access Level 2. The next level, Access Level 3, notes personal preferences, habits, hobbies and the like. Therefore, the user can assign permissions to each individual and/or community identified in the address book to the data stored in the data fields by assigned Access Level. Thus, all members of the "Work" Community have access to only Access Level 2 data relating to business information and clothing sizes. On the other hand, the "Church" Community has access to both the Access Level 1 and Access Level 2 data comprising basic user address information, data relating to business information and clothing sizes. Similarly, the members of the "Golf League" Community have access to basic user address information as well as personal preferences, habits, hobbies and the like. As an example of the granularity of selection available using this structure, the Access Levels provide a mechanism to block access to certain user data to entire communities or even to selected members of a community. Thus, the members of the community "Family" have access to Access Levels 1, 2, & 3, except for Mon & Dad Doe, who are blocked from accessing the data noted as being included in Access Level 3.

It is evident that many more Access Levels can be used and the management of the data in the various Access Levels can be effected in other ways to achieve the intended purpose of the shared address book. The community membership data management system 101 uses the user defined preferences to regulate the flow of data among the various communities to populate the address books of their members.

Data Updates to Community Address Books

Figure 6:
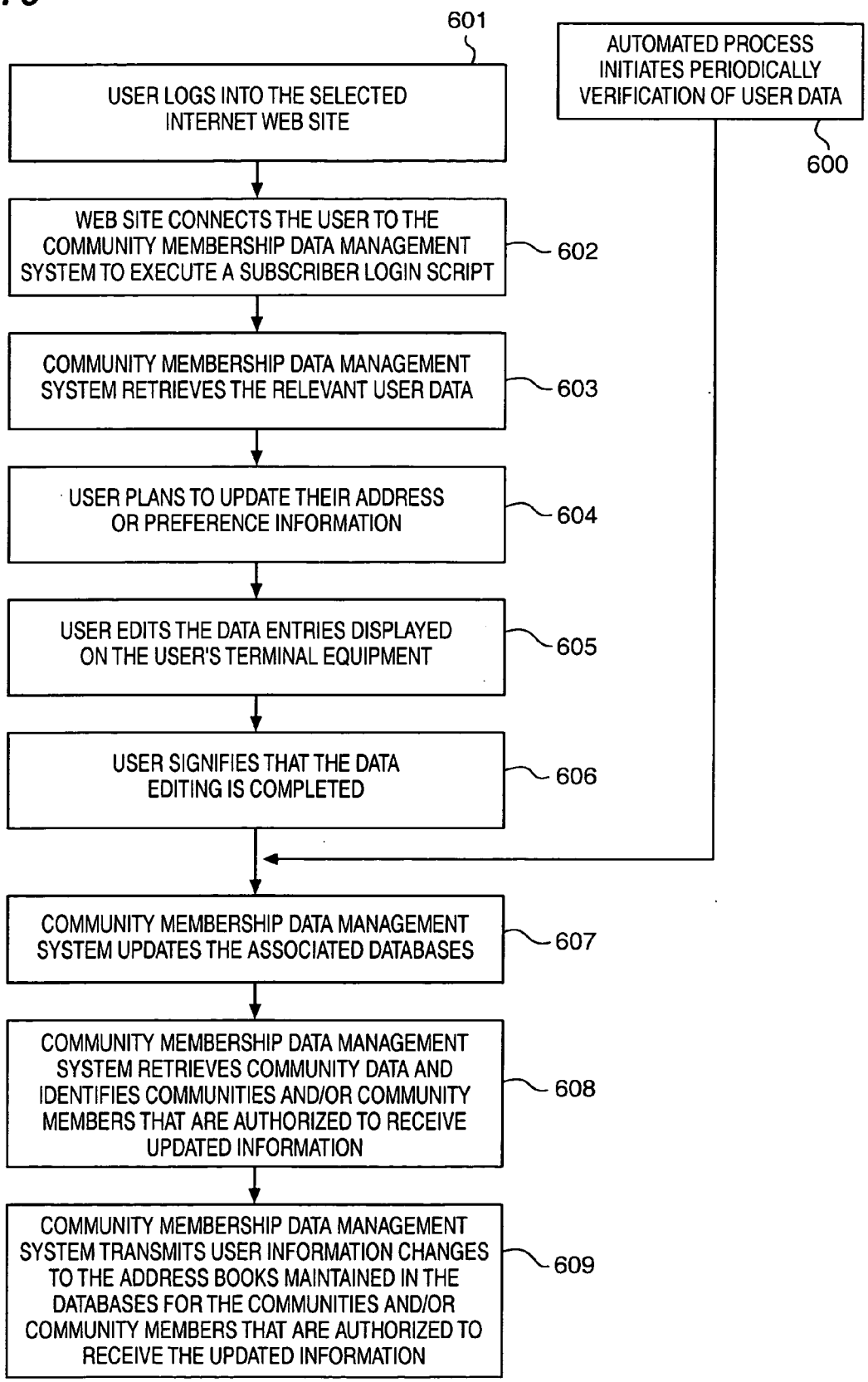
FIG. 6 illustrates in flow diagram form the operation of the present community membership data management system to update data entries stored in the address books of the members of the various communities served by the present community membership data management system.

FIG. 6 illustrates in flow diagram form the operation of the present community membership data management system to update data entries stored in the address books of the members of the various communities served by the present community membership data management system. In particular, at step 601, a user of the community membership data management system 101 logs into the selected Internet Web site, such as Hallmark.com, which provides the user with access to the community membership data management system 101. At step 602, the Web site Hallmark.com connects the user to the community membership data management system 101 to execute a subscriber login script which provides the user with a set of screens on the user's terminal device T1 to thereby enable the user to login by providing subscriber identification and account information, in well known fashion. The community membership data management system 101 as part of the login process confirms the identity of the user by comparing the user supplied data with data entries stored in Database A and Database H to confirm the user's identity and authority to access their address book entries stored in Database G. Once the user's identity has been validated, the community membership data management system 101 retrieves the relevant user data at step 603 from Databases B, D, F, & G. The content of the retrieved data is typically directed by the screen entries provided by the user to indicate the function that the user wishes to execute. Thus, the user in the present example would indicate at step 604 that the user plans to update their address or preference information stored in the associated databases. This can be accomplished at step 605 by the user either transferring data from the databases (AT, BT, ET, FT, GT) maintained on the user's terminal equipment T1 to the community membership data management system 101 or editing the data entries displayed on the screen of the user's terminal equipment T1. At step 606, the user signifies to the community membership data management system 101 that the data editing is completed and the user's data can be updated. (Alternatively, the user data can be periodically verified by an automated process, initiated at step 600, which compares the stored data with the official data stored in external databases, such as Postal Service Database PSS).

The community membership data management system 101 at step 607 updates the associated Databases that have data changed by the user's editing session. The interaction with the user proceeds as determined by the user's traversing of the displays presented by the community membership data management system 101 on user terminal equipment T1. The distributed updating of the user's information can proceed as a background process either concurrently with the remainder of the user's session, or can be effected at a later time. In either case, at step 608, the community membership data management system 101 retrieves the community data from Database D associated with this user and identifies, via the Access Level data entries shown in FIG. 7, the communities and/or community members that are authorized to receive the updated information relating to the user. At step 609, the community membership data management system 101 transmits the user information changes to the address books maintained in Database G for the communities and/or community members that are authorized to receive the updated information relating to the user so these address books can be updated.

While the data entries illustrated in FIG. 7 are individual based, it is expected that the user can specify entire communities as being authorized to access user information, without having to specify every member of the community. Thus, the user can be a member of a community, such as "Homeowner's Association Community" and on a mailing list of members of that Community, but may personally interact with only a subset of the members of that Community. Therefore, in the user's address book, the entries can include a number of individuals who are listed as "Homeowner's Association Community", but may also list "Homeowner's Association Community" as an authorized recipient of the identified user data. The community membership data management system 101 identifies redundant entries, since a number of individuals on the user's address book are also members of the "Homeowner's Association Community" and updates the address books accordingly.

Creation of a Community and Subscription of Members

Figure 4:
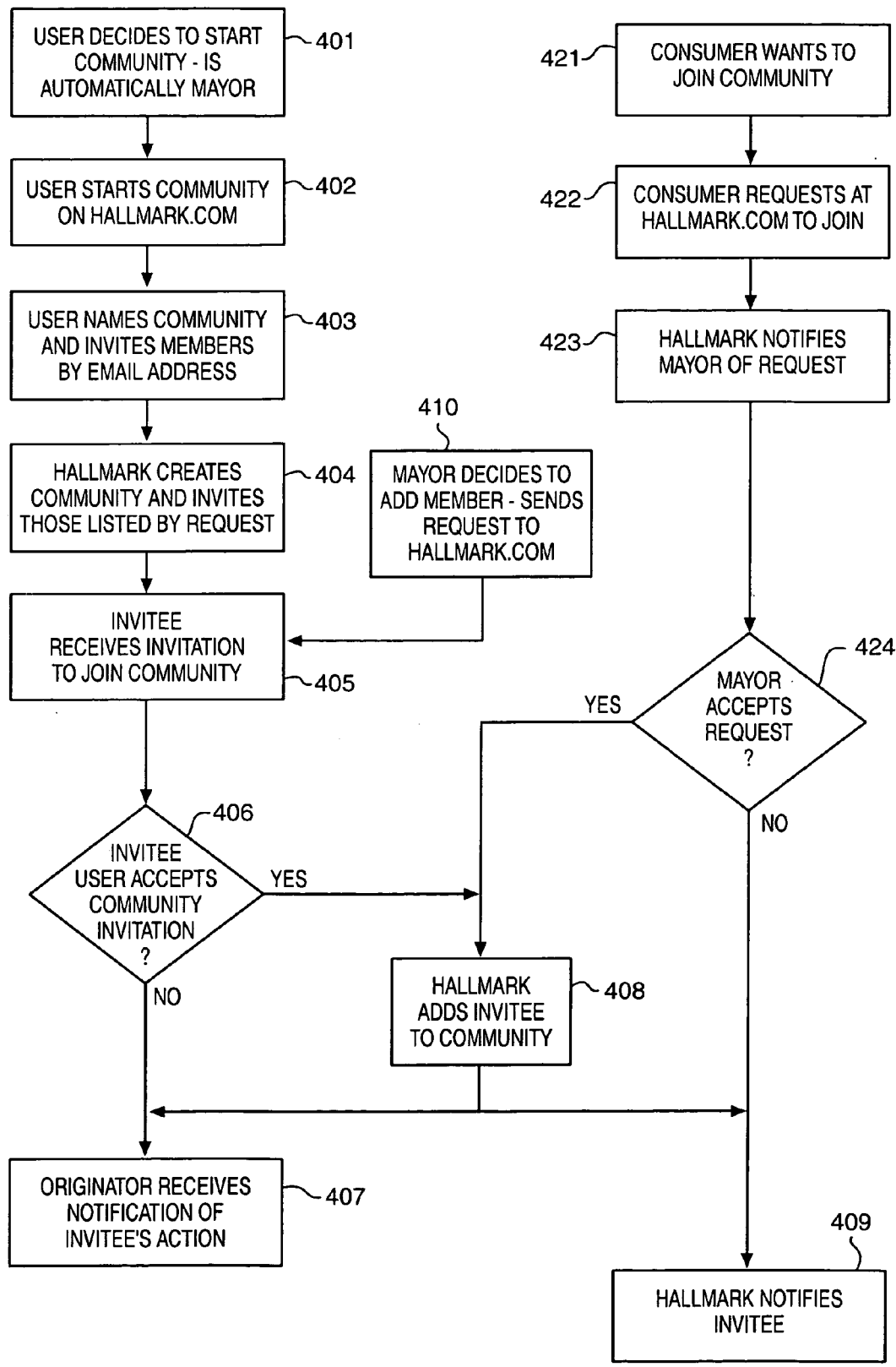
FIG. 4 illustrates in flow diagram form the operation of the present community membership data management system to create a community and to register members in this community.

FIG. 4 illustrates in flow diagram form the operation of the present community membership data management system to create a community and to register members in this community. At step 401, a user elects to create a new community and is by default automatically selected to manage the community as "Mayor". At step 402, the user initiates creation of the community by logging in to a selected Web site, such as Hallmark.com, where the present community membership data management system 101 executes. As part of step 402, the Web site Hallmark.com connects the user to the community membership data management system 101 to execute a subscriber login script which provides the user with a set of screens on the user's terminal device T1 to thereby enable the user to login by providing subscriber identification and account information, in well known fashion. The community membership data management system 101 as part of the login process confirms the identity of the user by comparing the user supplied data with data entries stored in database H and associated with the user's membership therein.

The user at step 403 names the community and invites a plurality of individuals to become members of the community by inputting their E-Mail addresses (or other delimiters) into the community database. The community membership data management system 101 at step 404 creates the community, optionally seeds the community database with data retrieved from various public sources, such as Postal Service Database PSS or Local Exchange Carrier databases, and invites the individuals listed to become members of the community. At step 405, the invitee receives an invitation from the community membership data management system 101 to join the community and at step 406 determines whether to become a member of the community. If the invitee elects not to join the community, then at step 407, the community membership data management system 101 records the invitee's choice and transmits a message to the mayor indicative of this invitee's decision. If the invitee elects to join the community at step 406, then processing advances to step 408 where the community membership data management system 101 adds the invitee to the community and at step 407, the community membership data management system 101 records the invitee's choice and transmits a message to the mayor indicative of this invitee's decision. If the mayor elects to add individuals to the invitee list, this is done at step 410 where the mayor logs into the community Web site and inputs the invitee's E-Mail address. Processing then returns to step 404, and processing proceeds as noted above.

If a consumer wishes to join the selected community as noted at step 421, then the consumer at step 422 logs into the community Web site and inputs their E-Mail address and a request to join the community. At step 423, the community membership data management system 101 notifies the mayor of the received membership request. At step 424, the mayor determines whether it is appropriate for the consumer to join the community. If not, the consumer is notified of the rejection at step 425. If the consumer is approved, at step 426, the community membership data management system 101 adds the invitee to the community and at step 407, the community membership data management system 101 records the invitee's choice and transmits a message to the mayor indicative of this invitee's decision. The invitee, once accepted, is thereby authorized to input data into the community membership data management system 101, which data represents invitee-specific data relevant to the community, such as: name, mailing address, date of birth, E-Mail address, telephone number, fax number, clothing sizes, gift preferences, and the like.

Application of the Address Book—Retail Order Entry Process

Figure 5A:
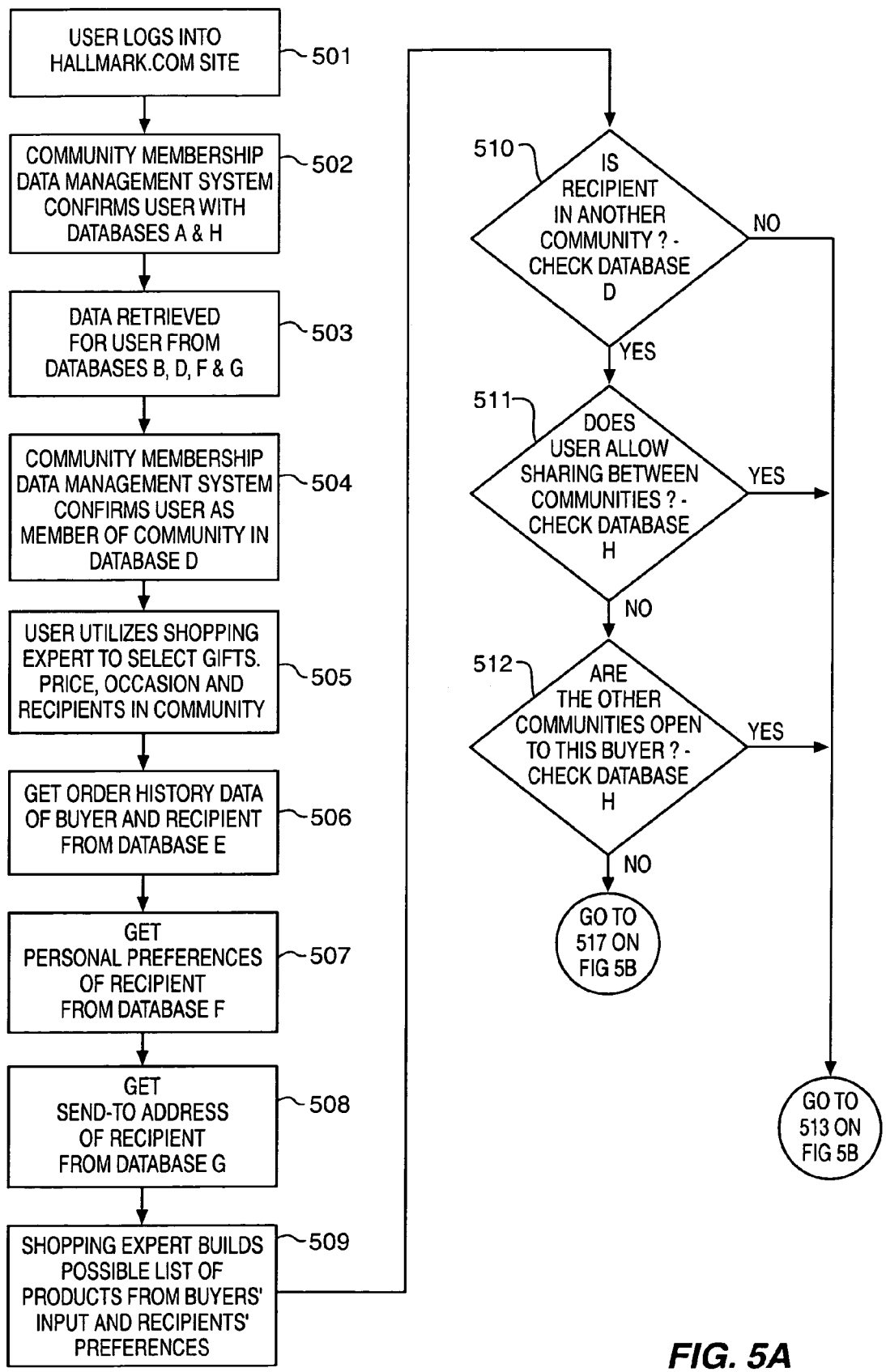
FIGS. 5A,5B illustrate in flow diagram form the operation of a typical user session with the present community membership data management system.
Figure 5B:
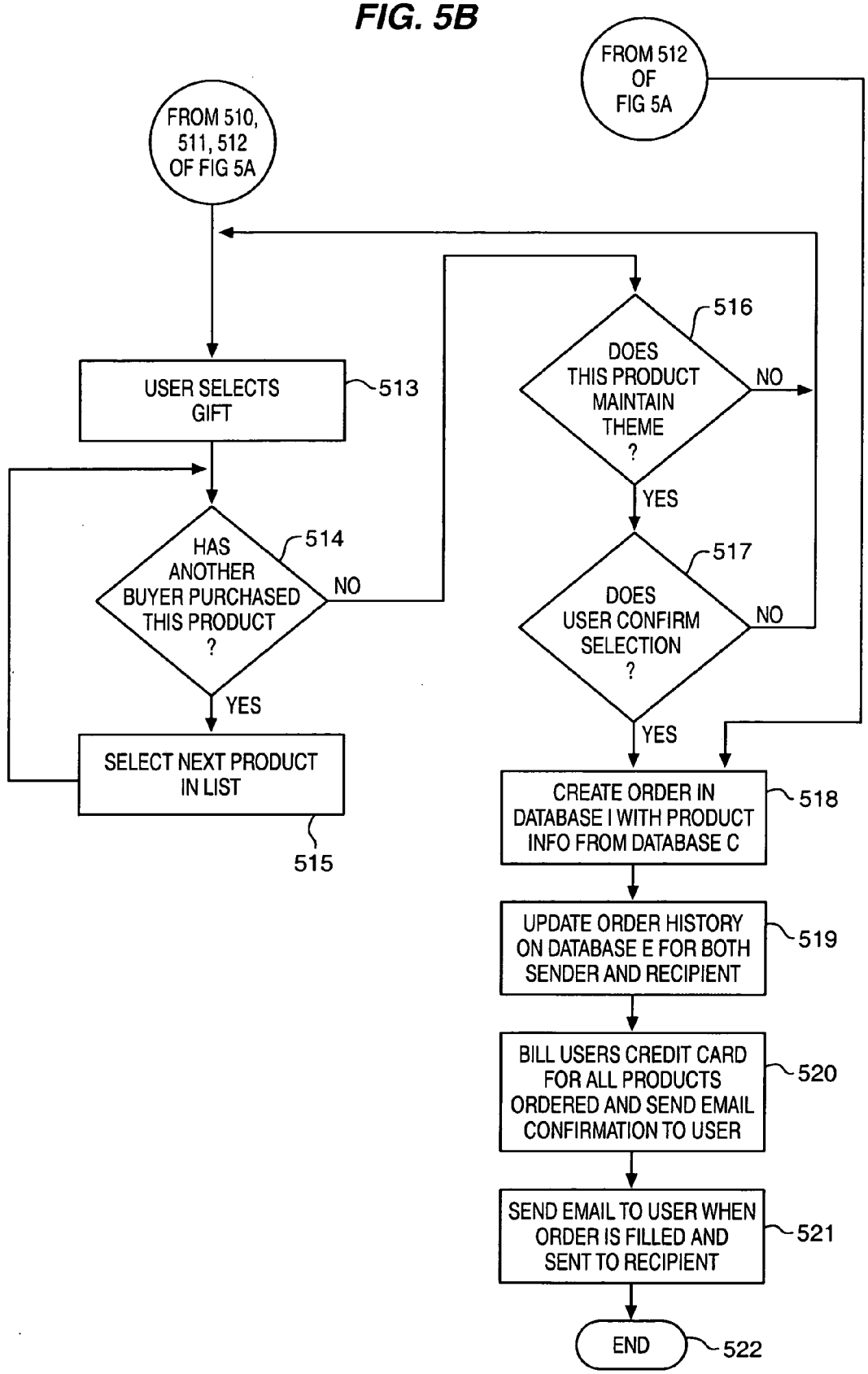

One use of the shared data provided by the community membership data management system 101 is the ability of the user to select and order gifts for recipients listed in the user's address book, with the assistance of the community membership data management system 101. Since the community membership data management system 101 maintains the address book data for the user and may store preference data for a recipient selected by the user, the gift selection process is facilitated by the community membership data management system 101. FIGS. 5A, 5B illustrate in flow diagram form the operation of a typical user session with the present community membership data management system 101 to select a gift for a designated recipient.

This session implements the example of a user accessing the community membership data management system 101 to purchase a gift for a recipient who is a member of a community in which the user is also a member. The user relies on the data stored in the community membership data management system 101 to obtain gift suggestions as well as an indication of whether the gift selected by the user for this recipient has already been purchased by another individual and sent to this recipient. The example can be for example, the purchase of a Christmas gift for an Aunt who lives a distance from the user. The aunt has interests in collecting "Dickens Village" houses and accessories and is an active participant in the community membership data management system 101 in terms of providing a definition of her interests and prior purchases and authorizing the release of this information to the community of relatives, of which the user is a member.

At step 501, a user logs into the selected Internet Web site, such as Hallmark.com, which provides the user with access to the community membership data management system 101. At step 502, the Web site Hallmark.com connects the user to the community membership data management system 101 to execute a subscriber login script which provides the user with a set of screens on the user's terminal device T1 to thereby enable the user to login by providing subscriber identification and account information, in well known fashion. The community membership data management system 101 as part of the login process confirms the identity of the user by comparing the user supplied data with data entries stored in Database A and Database H to confirm the user's identity and authority to access their address book entries stored in Database G. Once the user's identity has been validated, the community membership data management system 101 retrieves the relevant user data at step 503 from Databases B, D, F, & G. The content of the retrieved data is typically directed by the screen entries provided by the user to indicate the function that the user wishes to execute. Thus, the user in the present example would indicate that the user plans to purchase a gift for a member of a selected community, such as "Family Members—Johannsen462 Family" which identifies a community of related individuals having the family name "Johannsen" and the distinguishing identifier 462 to differentiate this community from other Johannsen families. The user also indicates that the user plans to use the gift suggestion capability of the community membership data management system 101. The community membership data management system 101 t step 504, confirms the user as a member of the selected community "Family Members—Johannsen462 Family" as indicated by an entry in Database D to thereby enable the user to access the community data for this community. At step 505 the user activates a shopping expert application SE that executes on the community membership data management system 101 to select a recipient appropriate gift, based on a number of user identified gift selection factors, including, but not limited to: price, occasion, recipient's preferences, user's preferences, and recipient's membership in the selected community. The community membership data management system 101 at step 506 retrieves the order history data for the user and the recipient from Database E. The personal preferences of the recipient are then retrieved at step 507 from Database F and the community membership data management system 101 then retrieves the send-to-address of the recipient at step 508 from Database G. The shopping expert application SE of the community membership data management system 101 builds a possible list of products that would be appropriate as a gift for the identified recipient, based on the user's input and the prestored preferences of the recipient at step 509. In the example used herein, the first choice may be the "Theatre Royal" building of the Dickens Village. Specific data relating to this gift can be obtained by the community membership data management system 101 from the Product System 102 via the data communication medium, which has product information stored on Database C. The Product System 102 may also have data regarding the prior purchases of the recipient, which may be shared with the community membership data management system 101 to avoid the user purchasing a gift that the recipient already has received or purchased. The shopping expert application SE may query a number of Product Systems 102, but for the sake of simplicity, only a single such system is illustrated herein.

The community membership data management system 101 now determines whether the user is authorized to proceed with the transaction. At step 510, the community membership data management system 101 determines whether the recipient is a member of another community. If not, processing advances to step 513 where the community membership data management system 101 enables the user to select a gift and at step 514 determines whether the product selected by the user for the selected recipient has already been purchased for this selected recipient by another individual. If so, processing advances to step 515 where the user is provided with an alternate gift suggestion, such as the "Old Curiosity Shop" and processing returns to step 514 where the community membership data management system 101 determines whether the product selected by the user for the selected recipient has already been purchased for this selected recipient by another. Processing continues through steps 513 to 515 until a gift is located, at which time the process cycles through step 516 where the consistency of this gift with the theme is identified and the user is provided with the appropriate data at step 517 to approve the gift selection. This gift selection process can entail several iterations of the process if the user is purchasing multiple gifts from different vendors or if the user rejects the selection presented at step 517. Once the gift selection is approved, then processing advances to step 518 where the community membership data management system 101 creates an order which is then transmitted over the data communication medium to the Product System 102 and stored therein in Database I with the product information selected by the user from Database C. The community membership data management system 101 updates the order history on Database E for both the user and the recipient at step 519. The community membership data management system 101 at step 520 then bills the user's credit card for all of the products ordered and transmits an E-Mail order confirmation to the user at the user's E-Mail address. As a follow up, the community membership data management system 101 transmits an E-Mail "order sent" confirmation to the user at the user's E-Mail address at step 521 once the order has been fulfilled by shipping the selected gift(s) to the selected recipient and the process exits at step 522, with the user's order history in Database E being updated.

In the qualification of the user noted above, if the recipient is a member of another community, as determined at step 510, the community membership data management system 101 advances to step 511 to determine whether the user has enabled sharing between communities, as indicated by a data entry in Database H. If sharing is enabled, processing advance to step 513 for gift order processing as noted above. If the sharing is not enabled, as determined at step 511, processing advances to step 512 where the community membership data management system 101 determines whether the other community is open to this user as indicated by the data entry in Database H. If so, processing advance to step 513 for gift order processing as noted above. If the community membership data management system 101 determines step 512 that the other community is not open to this user as indicated by the data entry in Database H, then processing exits and the order is not processed.

Alternate Community Structures, Content, and Processes

The communities that are served by the community membership data management system 101 are varied in structure, focus and type of members. For example, a community may be a transient community, such as a gift registry for a wedding. The members of this community represent friends and family of the bride and groom, with the data focus of this community being the gift registry for the bride and groom. The members of the community represent individuals wishing to purchase a gift for the bride and groom, and the community may be equipped with links to various commercial establishments that the bride and groom frequent to thereby facilitate the purchase of gifts for the bride and groom from the gift registry. The community may also record gifts that are purchased by members, which gifts are not listed in the initial gift registry, but may be thought provoking for other members of the community. Thus, the focus of this community is different from a typical address book/calendar system.

Another variation of gift ordering for the members of a community can be where a plurality of gifts are ordered by the user for a plurality of members of the community, with the mailing of the gifts being triggered by a designated date, such as the recipient's birthday. This can involve the community of "Social Group Associates" for example. The implementation of such a process is a variation of the basic process illustrated in flow diagram form in FIGS. 5A, 5B. The processing of this transaction proceeds as shown in FIGS. 5A, 5B, with the shopping expert SE at step 504 branching into the subroutine where the user specifies a plurality of recipients, in the present example being all of the members of a selected community. The shopping expert SE is directed by the user to send a social expression card and personalized T-shirt to each recipient to arrive at the recipient's residence by their birthday. The community membership data management system 101 proceeds through the steps of 505–508 where, for each recipient, the birth date is retrieved from Database F, shirt size and color preference is retrieved from Database F, the mailing address of the recipient is retrieved from Database G. Processing then jumps to step 518 where the community membership data management system 101 creates a future order in Database I with the product information selected by the user from Database C, in Product System 102 as described above. The community membership data management system 101 updates the order history on Database E for both the user and the recipient at step 519. The community membership data management system 101 at step 520 then bills the user's credit card for all of the products ordered and transmits an E-Mail order confirmation to the user at the user's E-Mail address. As a follow up, the community membership data management system 101 transmits an E-Mail "order sent" confirmation to the user at the user's E-Mail address at step 521 once each order has been fulfilled by shipping the selected gift(s) to the selected recipient at a set time prior to the recipient's birthday, as triggered by the future order stored in Database I.

Proxy Servers and Pseudonymous Transactions

While the method of using automated data collection and data maintenance tasks for computerized calendar and address book systems presents many advantages to users, there are important privacy issues for both users and providers that must be resolved if the community membership data management system 101 is to be used freely and without inhibition by users without fear of invasion of privacy. It is likely that users desire that some of the user-specific information in their user database remain confidential, to be disclosed only under certain circumstances related to certain types of transactions and according to their personal wishes for differing levels of confidentiality especially regarding their purchases and expressed interests. For example, as shown in the database example of FIG. 7, the access levels provide a mechanism to block access to certain user data to entire communities or even to selected members of a community. Thus, the members of the community "Family" have access to Access Levels 1, 2, 3, except for Mom & Dad Doe, who are blocked from accessing the data in Access Level 3.

However, complete privacy and inaccessibility of user transactions and user profile summary information would hinder implementation of the community membership data management system 101 and would deprive the user of many of the advantages derived through the system's use of user-specific information. In many cases, complete and total privacy is not desired by all parties to a transaction. For example, a buyer may desire to be targeted for certain mailings that describe products that are related to his or her interests, and a seller may desire to target users who are predicted to be interested in the goods and services that the seller provides. Indeed, the usefulness of the technology described herein is contingent upon the ability of the system to collect and compare data about many users, many recipients and many products. A compromise between total user anonymity and total public disclosure of the user's search profiles or product interest summary is a pseudonym. A pseudonym is an artifact that allows a service provider to communicate with users and build and accumulate records of their preferences over time, while at the same time remaining ignorant of the users' true identities, so that users can keep their purchases or preferences private. A second and equally important requirement of a pseudonym system is that it provide for digital credentials, which are used to guarantee that the user represented by a particular pseudonym has certain properties. These credentials may be granted on the basis of result of activities and transactions conducted by means of the community membership data management system 101, or on the basis of other activities and transactions conducted on the network of the present community membership data management system 101, on the basis of users' activities outside of network. This is accomplished by the implementation of a set of one or more pseudonymous proxy servers PSS distributed throughout the network. Each pseudonymous proxy server PSS is a server which communicates with clients and other servers in the network either directly or through anonymizing mix paths. Any server in the network may be configured to act as a proxy server in addition to its other functions. Each proxy server provides service to a set of users, which set is termed the "user base" of that proxy server. A given proxy server provides three sorts of service to each user in its user base, as follows:

1. The first function of the pseudonymous proxy server PSS is to bidirectionally transfer communications between the user and other entities such as information servers (possibly including the pseudonymous proxy server PSS itself) and/or other users. Specifically, the pseudonymous proxy server PSS communicates with server (and thence with the user), either through anonymizing mix paths that obscure the identity of server and the user, in which case the pseudonymous proxy server PSS knows the user only through a secure pseudonym, or else through a conventional virtual point-to-point connection, in which case the pseudonymous proxy server PSS knows the user by user address at server, which address may be regarded as a non-secure pseudonym for the user.

2. A second function of the pseudonymous proxy server PSS is to record user-specific information associated with the user. This user-specific information includes a user profile and an interest profile for the user, as well as a list of access control instructions specified by the user and a set of one-time return addresses provided by the user that can be used to send messages to the user without knowing the user's true identity. All of this user-specific information is stored in a database that is keyed by the user's pseudonym (whether secure or non-secure) on the pseudonymous proxy server PSS.

3. A third function of the pseudonymous proxy server PSS is to act as a selective forwarding agent for unsolicited communications that are addressed to the user: the pseudonymous proxy server PSS forwards some such communications to the user and rejects others, in accordance with the access control instructions specified by the user.

Validation and Allocation of a Unique Pseudonym

The pseudonymous proxy server PSS allows for individuals to use different pseudonyms with different organizations (such as banks and coalitions of service providers). The organizations which are presented with a pseudonym have no more information about the individual than the pseudonym itself and a record of previous transactions carried out under that pseudonym.

While the user may use a single pseudonym for all transactions, in the more general case a user has a set of several pseudonyms, each of which represents the user in his or her interactions with a single provider or coalition of service providers. Each pseudonym in the pseudonym set is designated for transactions with a different coalition of related service providers, and the pseudonyms used with one provider or coalition of providers cannot be linked to the pseudonyms used with other disjoint coalitions of providers. All of the user's transactions with a given coalition can be linked by virtue of the fact that they are conducted under the same pseudonym, and therefore can be combined to define a unified picture, in the form of a user profile and an interest profile, of the user's interests vis-a-vis the service or services provided by said coalition.

Thus, the pseudonymous proxy server PSS can collect information about the user's purchases with many different vendors and summarize these purchases into a composite interest profile. The composite interest profile can then be shared with the community membership data management system 101 for inclusion into Database F without violating the user's privacy, since the details of the user's purchases are not provided, only a composite image of the user's interests. This process enables the community membership data management system 101 to obtain a significant amount of data relating to the users who maintain address books thereon and their target recipients, without jeopardizing their privacy.

SUMMARY

The community membership data management system identifies each user and their associated communities of interest. When the user's data is updated, the update is automatically propagated to all of the identified associated communities of interest and the members of those communities who have permission to receive that data. Thus, each user of the present community membership data management system has their computerized calendar and address book system automatically populated with data, which data is continuously and automatically updated.

What is claimed:

1. A data management system for automatically maintaining address information in a plurality of subscriber address books, comprising:

means for storing a plurality of subscriber address books, each said address book comprising a plurality of entries, each entry corresponding to a named individual and including at least address data for said named individuals; and means, responsive to a change in data associated with an identified individual, for propagating said change to ones of said plurality of subscriber address books which contain an entry corresponding to said identified individual.

2. The data management system of claim 1 wherein said means for propagating comprises:

means for storing data to delimit which ones of said address books, which contain an entry corresponding to said identified individual, are authorized to receive said change to said individual data.

3. The data management system of claim 2 wherein said means for propagating further comprises:
means for defining groups of address books, which contain an entry corresponding to said identified individual, that are authorized to receive said change to said individual data.

4. The data management system of claim 1 wherein said individual address data is divided into a plurality of access levels, said means for propagating comprises:
means for storing access level data to delimit which ones of said individual data are authorized to receive said change to said individual data.

5. The data management system of claim 4 wherein said means for propagating further comprises:
means for defining groups of address books, which contain an entry corresponding to said identified individual, that are authorized to receive said change to said individual data.

6. The data management system of claim 1 further comprising:
means for retrieving data from a public database to verify a set of individual data associated with an identified individual.

7. The data management system of claim 6 further comprising:
means, responsive to said means for retrieving identifying a change in data in said individual data associated with an identified individual, for activating said means for propagating.

8. A method of operating a data management system for automatically maintaining address information in a plurality of subscriber address books, comprising the steps of:
storing a plurality of subscriber address books, each said address book comprising a plurality of entries, each entry corresponding to a named Individual and including at least address data for said named individuals; and
propagating, in response to a change in data associated with an identified individual, said change to ones of said plurality of subscriber address books which contain an entry corresponding to said identified individual.

9. The method of operating a data management system of claim 8 wherein said step of propagating comprises:
storing data to delimit which ones of said address books, which contain an entry corresponding to said identified individual, are authorized to receive said change to said individual data.

10. The method of operating a data management system of claim 9 wherein said step of propagating further comprises:
defining groups of address books, which contain an entry corresponding to said identified individual, that are authorized to receive said change to said individual data.

11. The method of operating a data management system of claim 8 wherein said individual address data is divided into a plurality of access levels, said step of propagating comprises:
storing access level data to delimit which ones of said individual data are authorized to receive said change to said individual data.

12. The method of operating a data management system of claim 11 wherein said step of propagating further comprises:
defining groups of address books, which contain an entry corresponding to said identified individual, that are authorized to receive said change to said individual data.

13. The method of operating a data management system of claim 8 further comprising the step of:
retrieving data from a public database to verify a set of individual data associated with an identified individual.

14. The method of operating a data management system of claim 13 further comprising:
activating, in response to said step of retrieving identifying a change in data in said individual data associated with an identified individual, said step of propagating.

15. A data management system for automatically maintaining user data among a plurality of communities, each of which contains a plurality of members, comprising:
means for storing community membership data for a plurality of communities, each said community comprising a plurality of entries, each entry corresponding to a named individual who is a member of said community and including a set of individual data for each of said individuals;
means for providing a user with access to a set of said individual data of an identified individual who is a member of a same community as said user; and
means, responsive to a change in individual data associated with said identified individual, for propagating said change to all of said plurality of communities in which said individual is a member.

16. The data management system of claim 15 further comprising:
means for defining a set of data sharing permissions, each of which define access by members of a community to a subset of the member's data; and
means for sharing said individual data among predetermined members of each community who are identified by said set of permissions.

17. The data management system of claim 16 further comprising;
means, responsive to a set of individual data of an identified individual, for generating at least one gift giving selection for said identified individual.

18. The data management system of claim 17 wherein said means for generating comprises:
means for retrieving gift giving selection data from a third party vendor;
means for displaying images illustrative of gift giving selections; and
means, responsive to a user approving at least one of said gift giving selections for said identified individual, for fulfilling said gift giving selection.

19. The data management system of claim 17 further comprising:
means, responsive to a user approving at least one of said gift giving selections for said identified individual, for fulfilling said gift giving selection.

20. The data management system of claim 19 wherein said means for fulfilling comprises:
means for transmitting said gift giving selection to a third party vendor.

21. The data management system of claim 15 further comprising:
means for retrieving data from a public database to verify a set of individual data associated with an identified individual.

22. The data management system of claim 21 further comprising:

means, responsive to said means for retrieving identifying a change in data in said set of individual data associated with an identified individual, for activating said means for propagating.

23. A method of operating a data management system for automatically maintaining user data among a plurality of communities, each of which contains a plurality of members, comprising the steps of:

storing community membership data for a plurality of communities, each said community comprising a plurality of entries, each entry corresponding to a named individual who is a member of said community and including a set of individual data for each of said individuals;

providing a user with access to a set of said individual data of an identified individual who is a member of a same community as said user; and propagating, in response to a change in individual data associated with said identified individual, said change to all of said plurality of communities in which said individual is a member.

24. The method of operating a data management system of claim 23 further comprising the steps of:

defining a set of data sharing permissions, each of which define access by members of a community to a subset of the member's data; and sharing said individual data among predetermined members of each community who are identified by said set of permissions.

25. The method of operating a data management system of claim 24 further comprising the step of:

generating, In response to a set of individual data of an identified individual, at least one gift giving selection for said identified individual.

26. The method of operating a data management system of claim 25 further comprising the step of:

fulfilling, in response to a user approving at least one of said gift giving selections for said identified individual, said gift giving selection.

27. The method of operating a data management system of claim 26 wherein said step of fulfilling comprises:

transmitting said gift giving selection to a third party vendor.

28. The method of operating a data management system of claim 25 wherein said step of generating comprises:

retrieving gift giving selection data from a third party vendor;

displaying images illustrative of gift giving selections; and fulfilling, in response to a user approving at least one of said gift giving selections for said identified individual, said gift giving selection.

29. The method of operating a data management system of claim 23 further comprising the step of:

retrieving data from a public database to verify a set of individual data associated with an identified individual.

30. The method of operating a data management system of claim 29 further comprising the step of:

activating, in response to said step of retrieving identifying a change in data in said set of individual data associated with an identified individual, for said step of propagating.

* * * * *